United States Patent [19]

Edvardsson

[11] Patent Number: 5,664,647
[45] Date of Patent: Sep. 9, 1997

[54] BRAKE DRUM LEVER FOR AN AUTOMOTIVE S-CAM DRUM BRAKE

[75] Inventor: Kjell Edvardsson, Lund, Sweden

[73] Assignee: Haldex AB, Sweden

[21] Appl. No.: 648,186

[22] PCT Filed: Nov. 23, 1994

[86] PCT No.: PCT/SE94/01115

§ 371 Date: Jul. 3, 1996

§ 102(e) Date: Jul. 3, 1996

[87] PCT Pub. No.: WO95/14870

PCT Pub. Date: Jun. 1, 1995

[30] Foreign Application Priority Data

Nov. 26, 1993 [SE] Sweden ................................. 9303921

[51] Int. Cl.⁶ .................................................. F16D 51/00
[52] U.S. Cl. ................................. 188/79.55; 192/111 A
[58] Field of Search ........................ 188/79.55, 196 BA, 188/196 P, 196 B; 192/111 A

[56] References Cited

U.S. PATENT DOCUMENTS

| | | | |
|---|---|---|---|
| 3,901,357 | 8/1975 | Reitz et al. | 188/79.55 |
| 4,094,390 | 6/1978 | Neuman | 188/196 D |
| 4,440,268 | 4/1984 | Karlsson | 188/79.55 |
| 4,583,622 | 4/1986 | Ebbinghaus et al. | 188/79.55 |
| 4,875,557 | 10/1989 | Hagin et al. | 188/79.55 |

FOREIGN PATENT DOCUMENTS 0154799  9/1985  European Pat. Off. .

*Primary Examiner*—Peter M. Poon
*Attorney, Agent, or Firm*—Laurence R. Brown

[57] ABSTRACT

A brake lever for an automotive S-cam drum brake has a toothed conical clutch (14) for transmitting torque in one direction between two coaxial members (4, 10) rotatably arranged relative to each other. Each tooth in this clutch is asymmetrical, its torque transmitting flank forming a greater angle with the normal than its opposite flank.

4 Claims, 2 Drawing Sheets

BRAKE DRUM LEVER FOR AN AUTOMOTIVE S-CAM DRUM BRAKE

TECHNICAL FILED

This invention relates to a brake lever for an automotive S-cam drum brake, having a toothed clutch for transmitting torque in one direction between two coaxial members rotatably arranged relative to each other.

BACKGROUND OF THE INVENTION

The applicant has produced a brake lever of the above kind in large amounts for many years. This brake lever containing a slack adjuster for keeping the slack or distance between the brake linings and the brake drum constant irrespective of the brake lining wear is very well known in the art.

The brake lever has the general function of transmitting the brake force from a brake cylinder to a splined S-cam shaft, on which it is mounted. The main parts of the slack adjuster in the brake lever are a worm wheel mounted on the S-cam shaft and a worm screw meshing with the worm wheel. A slack adjusting movement may be transmitted from a control unit to the worm screw via the following parts coaxially arranged on the worm screw: a locking sleeve and a clutch sleeve, which are connected by means of a one-way clutch in the form of a locking spring, the clutch sleeve being connected to the worm screw by the toothed conical clutch referred to under the heading "Technical Field". This clutch is held engaged by a powerful clutch spring acting axially on the worm screw.

The primary function of the toothed conical clutch is to disconnect the adjusting mechanism during the elasticity part of the brake application so as to obtain a true slack adjusting function. During the adjustment, which occurs at brake release, the clutch is engaged and transmits an angular movement and a torque, the latter being great enough for affecting slack adjustment.

The clutch, however, has also to allow a manual rotation of the worm screw at replacement of worn out brake linings and at installation of the lever, which means that the maximum torque which may be transmitted shall not be too high.

In the present design with a certain number of symmetrical teeth in the clutch a balance between the above two factors has been reached with a certain angle between each tooth flank and the normal; in a practical case this angle is 68° or in total 136° between the two flanks.

It has appeared that the main reason for performance failure of the slack adjuster is that the conical clutch slips due to worn out teeth.

THE INVENTION

An improved toothed clutch with a longer life is according to the invention obtained in that each clutch tooth is made asymmetrical, its torque transmitting flank forming a greater angle with the normal than its opposite flank.

This improved design is based on the knowledge that the two functions of the clutch as mentioned above are performed by the same tooth flank, whereas the opposite one is never actually utilized.

The result of the asymmetrical design is that the active flank length increases and accordingly that the useful life greatly increases.

If according to the invention the number of clutch teeth and the angle of the torque transmitting flank are unchanged in relation to the conventional clutch with symmetrical clutch teeth, the added advantage is obtained that parts for conventional, symmetrical clutches are interchangeable with parts for asymmetrical clutches according to the invention, which simplifies the spare parts business.

It is a type of a paradox that the clutch according to the invention transmits torque in the rotational direction that normally at toothed one-way clutches is the release direction.

The invention has been described in conjunction with a special brake lever or slack adjuster. However, it is not limited to use herein. Other brake levers designed with the same operational characteristics can take advantage of the improvement according to the invention.

Also, the toothed clutch in the described slack adjuster is conical, but the principle of the invention can equally well be used in any toothed clutch of the kind referred to.

THE DRAWING

The invention will be described in further detail below under reference to the accompanying drawing, in which FIG. 1 is a partly sectional side view of a brake lever incorporating the invention, FIG. 2 is a side view to a slightly larger scale of a worm screw in the brake lever, FIG. 3 is a section generally along the line III—III in FIG. 2 but to a considerably larger scale, and FIG. 4 corresponds to FIG. 3 but shows two cooperating members of a clutch according to the invention.

DETAILED DESCRIPTION OF A PREFERRED EMBODIMENT

Figure 1:
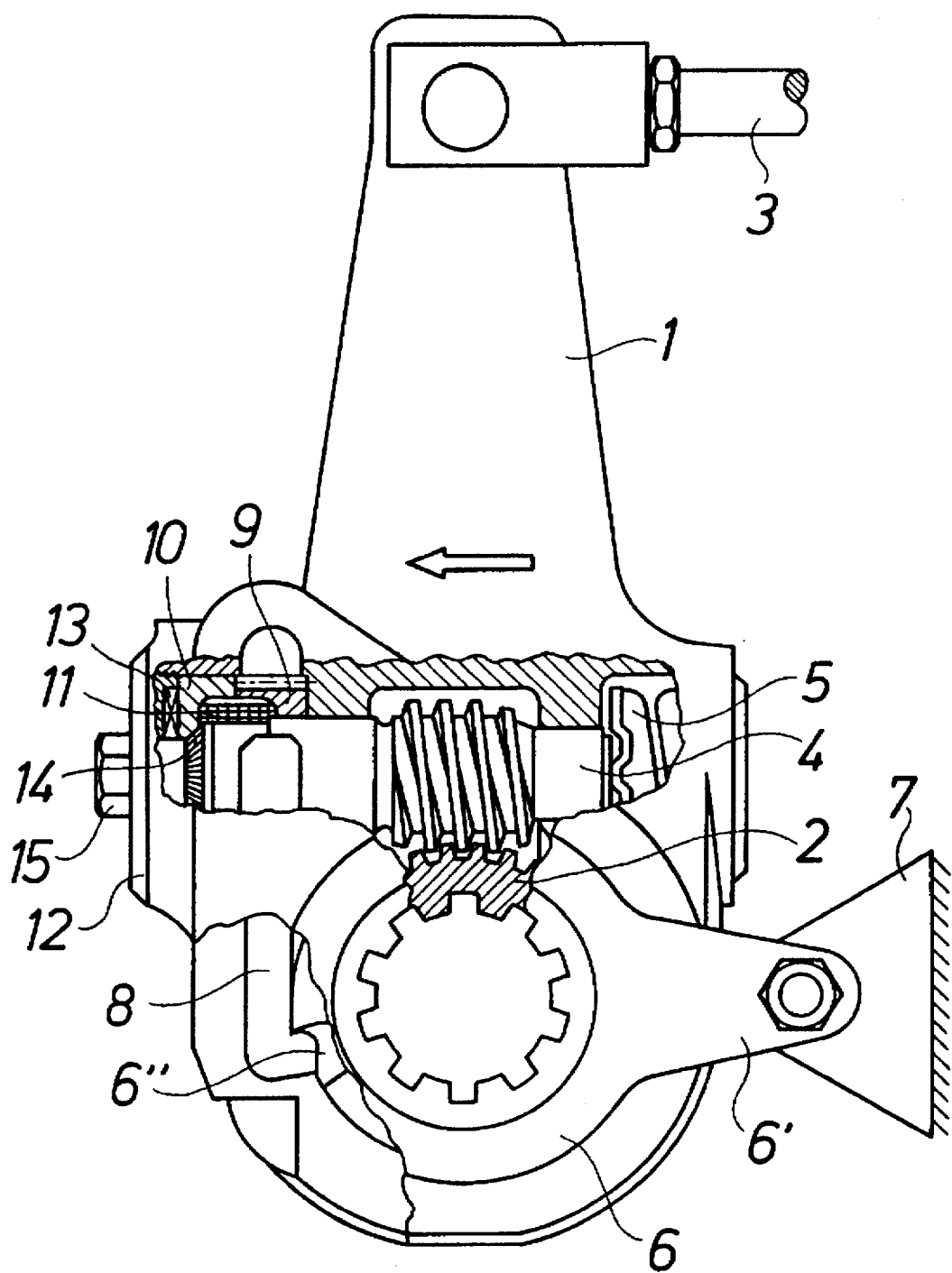
Figure 2:
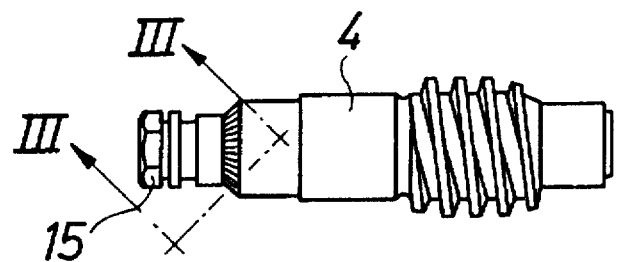

A brake lever as shown in FIG. 1 is conventional. As is well known in the art, it is mounted on a splined S-cam shaft in a drum brake, preferably for heavy road vehicles, such as trucks and buses. The purpose thereof is to transmit brake force from a normally pneumatic brake cylinder to the S-cam but also—due to the fact that it is provided with a built-in slack adjuster—to adjust for the increasing wear of the brake linings in the brake drum.

As the brake lever as shown in FIG. 1 is conventional and well known in the art, only a comparatively brief description thereof will be given.

A housing 1 is provided with a rotatable worm wheel 2 for mounting on an S-cam shaft (not shown). The end of the housing 1 is pivotably connected to a push rod 3 of a brake cylinder (not shown). A worm screw 4 engaging the worm wheel 2 is rotatably arranged in the housing 1 and is biassed to the left in FIG. 1 by a powerful clutch spring 5.

A control disc 6 is coaxial with the worm wheel 2 and is rotatable independently thereof. It has a control arm 6' connected to a fix-point 7 and a notch 6" for defining a control distance or A-measure for the adjuster.

A rack 8 engaging the notch 6" with its lower end is axially movable in the housing 1. Its toothed upper end engages a toothed locking sleeve 9 rotatably arranged on the worm screw 4. Coaxial with the locking sleeve 9 is a clutch sleeve 10, and these two sleeves 9 and 10 are connected by means of an internal locking spring 11 with the function to prevent mutual rotation between the sleeves in one rotational direction. The clutch sleeve 10 is journalled against a housing cover 12 by means of a bearing 13.

A toothed conical clutch 14 connects the clutch sleeve 10 to the worm screw 4. The invention concerns this clutch 14, which has the ability to convey slack adjusting angular movement to the worm screw 4 (and thus further to the worm wheel 2) from the clutch sleeve 10, the locking sleeve 9 (via the locking spring 11), the rack 8, and the control disc 6.

The detailed function of the slack adjuster will not be described, only insofar as it is of importance for a proper understanding of the invention.

The primary function of the clutch 14, consisting of two toothed conical surfaces and held engaged by the clutch spring 5, is to eliminate the dependence of the elasticity in the brake on the slack adjuster. This means that the clutch 14 performs its disengaging and engaging function at each brake operation (application and release).

During the adjusting phase, which happens at brake release, the clutch 14 is engaged and transmits a movement and a torque. The torque transmitting ability of the clutch in this phase has to be great enough for effecting slack adjustment.

The maximum torque which can be transmitted depends to a great extent on the clutch teeth, and the most common cause for a non-functioning adjuster is that the clutch 14 slips due to worn out teeth.

However, the teeth of the clutch 14 must not be designed in such a way that the maximum torque which can be transmitted is too high. The reason for this is that the worm screw 4 has to be rotated manually—via an external tool grip 15—at the installation of the brake lever and after replacement of worn out brake linings in the drum brake.

When the slack between the brake linings and the brake drum is to be decreased, the worm screw 4 is rotated in a direction, the clock-wise direction, which is permissible independently of the clutch 14, as this direction coincides with the non-locking direction of the locking spring 11, which is arranged in series with the clutch 14.

In the opposite direction on the other hand, when the slack is to be increased, the locking spring 11 is locked, which means that the conical clutch 14 has to slip over its teeth. If the torque in this case becomes too great, certain parts in the adjuster may be overloaded, and it may also become difficult to manually adjust the lever.

Figure 3:
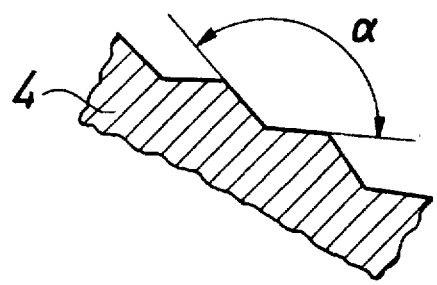

FIG. 3 is a section through the clutch teeth on the worm screw 4. At the design of the brake lever it was found that a suitable compromise between the requirements for a satisfactory slack adjusting capacity and an acceptable low torque at slack decrease is obtained if the total flank angle α of the symmetrical teeth in the conical clutch is 136°, when the total number of teeth is 90.

When it was realized that only one flank of each symmetrical tooth is actually used for obtaining the desired characteristics of the clutch in the design and that the problem with the clutch is worn out teeth, the first step towards the present invention had been taken.

Figure 4:
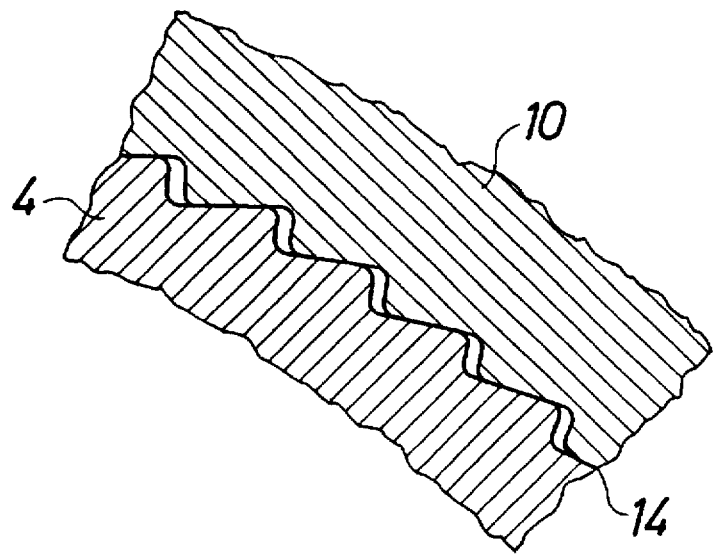

The improvement according to the invention as illustrated in FIG. 4 lies in the provision of asymmetrical teeth in the conical clutch 14. The flank angle of the active tooth flank is maintained as it was in the symmetrical case, namely 68° with the normal, whereas the flank angle of the inactive tooth flank is decreased, for example to 15° or 25° with the normal, so that asymmetrical teeth are obtained. This means that the tooth height is increased with an unchanged number of teeth.

The increased tooth height has the result that more material can be worn away, before the flank angle has decreased to the extent that the function of the clutch 14 is negatively affected; this means that the working life of the clutch is increased.

If the tooth height would be increased with symmetrical teeth, the total number of teeth would decrease with the negative effect that the surface pressure between the teeth would increase.

A further advantage with the new design with an unchanged number of teeth and an unchanged flank angle for the active tooth flank is that parts with old symmetrical tooth design and new asymmetrical tooth design can be mingled without any risk for the proper function, which is a special advantage for the spare parts handling. The angle of the inactive flank is without importance for the function of the brake lever, because if the clutch is loaded in the direction for engaging this flank, slip will occur in the locking spring 11, which then will work in its free direction.

I claim:

1. A brake lever for an automotive S-cam drum brake, having a toothed one-way clutch (14) for transmitting torque through a torque transmitting tooth flank in a slack decreasing direction between two coaxial members (4, 10) rotatably arranged relative to each other, characterized in that each clutch tooth is asymmetrical, its torque transmitting flank forming a greater angle with a normal, which extends through the tooth apex and into the tooth, than an opposite tooth flank thereby to provide a greater flank length with longer life.

2. A brake lever according to claim 1, characterized in that the greater angle is 68°.

3. A brake lever according to claim 1, characterized in that the angle of the opposite flank is between 15° and 25°.

4. A brake lever according to claim 1, characterized in that the toothed clutch (14) is a conical clutch formed between a worm screw (4) and a clutch sleeve (10).

* * * * *